United States Patent
Huang et al.

(10) Patent No.: US 11,133,865 B2
(45) Date of Patent: Sep. 28, 2021

(54) OPTICAL NETWORK PERFORMANCE EVALUATION USING A HYBRID NEURAL NETWORK

(71) Applicant: NEC Laboratories America, Inc., Princeton, NJ (US)

(72) Inventors: Yue-Kai Huang, Princeton, NJ (US); Shaoliang Zhang, Princeton, NJ (US); Ezra Ip, West Windsor, NJ (US); Jiakai Yu, Tuscon, AZ (US)

(73) Assignee: NEC Corporation

( * ) Notice: Subject to any disclaimer, the term of this patent is extended or adjusted under 35 U.S.C. 154(b) by 0 days.

(21) Appl. No.: 17/106,143

(22) Filed: Nov. 29, 2020

(65) Prior Publication Data

US 2021/0111794 A1    Apr. 15, 2021

Related U.S. Application Data

(63) Continuation-in-part of application No. 16/596,582, filed on Oct. 8, 2019, now Pat. No. 10,887,009.

(51) Int. Cl.
| | | |
|---|---|---|
| *H04B 10/079* | (2013.01) | |
| *G06N 3/04* | (2006.01) | |
| *H04L 27/34* | (2006.01) | |
| *H04B 10/07* | (2013.01) | |

(52) U.S. Cl.
CPC ..... *H04B 10/07953* (2013.01); *G06N 3/0454* (2013.01); *H04B 10/07* (2013.01); *H04B 10/079* (2013.01); *H04B 10/0795* (2013.01); *H04L 27/3405* (2013.01)

(58) Field of Classification Search
None
See application file for complete search history.

(56) References Cited

U.S. PATENT DOCUMENTS

| | | | |
|---|---|---|---|
| 10,171,161 B1* | 1/2019 | Cote | H04B 10/6161 |
| 2017/0351293 A1* | 12/2017 | Carolan | G06E 3/005 |
| 2018/0132159 A1* | 5/2018 | Strong | H04W 48/20 |
| 2019/0155709 A1* | 5/2019 | de Oliveira | G06N 3/08 |

OTHER PUBLICATIONS

A. S. Kashi et al., "Fiber Nonlinear Noise-to-Signal Ratio Monitoring Using Artificial Neural Networks," 2017 European Conference on Optical Communication (ECOC), 2017, pp. 1-3, doi: 10.1109/ECOC.2017.8345880. (Year: 2017).*

* cited by examiner

*Primary Examiner* — Darren E Wolf
(74) *Attorney, Agent, or Firm* — Joseph Kolodka

(57) ABSTRACT

Aspects of the present disclosure describe systems, methods. and structures in which a hybrid neural network combining a CNN and several ANNs are shown useful for predicting G-ONSR for Ps-256QAM raw data in deployed SSMF metro networks with 0.27 dB RMSE. As demonstrated, the CNN classifier is trained with 80.96% testing accuracy to identify channel shaping factor. Several ANN regression models are trained to estimate G-OSNR with 0.2 dB for channels with various constellation shaping. Further aspects include the tuning of existing optical networks and the characterization of retrofit/upgraded optical networks to estimate capacity—both aspects employing our inventive hybrid neural network methodology.

10 Claims, 11 Drawing Sheets

OPTICAL NETWORK PERFORMANCE EVALUATION USING A HYBRID NEURAL NETWORK

CROSS REFERENCE TO RELATED APPLICATIONS

This application is a continuation of U.S. patent application Ser. No. 16/596,582 filed 8 Oct. 2019, the entire contents of which is incorporated by reference as if set forth at length herein.

TECHNICAL FIELD

This disclosure relates generally to optical communications systems, methods, and structures. More particularly, it describes systems, methods, and structures for generalized—optical network performance evaluation using a hybrid neural network (NN).

BACKGROUND

As is known in the optical communications arts, probabilistic-shaped quadrature amplitude modulation can improve transmission capacity in existing optical transport systems by providing transmission performance approaching theoretical values. However, quality of transmission (QoT) requirements are much higher for PS-QAM when operating at high SE regime(s). As those skilled in the art will know and appreciate—for coherent open line systems—G-OSNR is a favored indicator for evaluating transmission performance for optical communications channels independently of modulation format(s) and transponder type(s). G-OSNR not only considers the linear noise from amplified spontaneous emission (ASE) but also the nonlinear noise introduced by self-phase modulation (SPM) and cross-phase modulation (XPM).

Conventionally, to determine G-OSNR, Q factors are measured manually after the received constellations are already restored using a dedicated digital signal processor (DSP) for each modulation format in different transponders. Therefore, the estimation process is time-consuming and not particularly cost-effective, while the G-OSNR estimation results in one modulation format that may not be accurate enough for others.

SUMMARY

An advance in the art is made according to aspects of the present disclosure directed to improved systems, methods, and structures providing G-OSNR analysis and estimation. In sharp contrast to the prior art, systems, methods, and structures according to aspects of the present disclosure advantageously provides the estimation directly from raw data input PS-QAM as compared to the prior art methods of directly measuring transmission performance (Q or BER) or performing analysis on a recovered signal constellation.

Of particular advantage, systems, methods, and structures according to aspects of the present disclosure avoids the need for additional hardware and digital signal processing (DSP)—as is required in a typical prior art optical transponder.

Of additional distinction, systems, methods, and structures according to aspects of the present disclosure employ a two-stage hybrid neural network to estimate G-OSNR via PS-QAM formats. Advantageously, shaping factor(s) of the PS-QAM modulated channels are adjusted to accommodate a wide range of spectral efficiencies. By analyzing raw data of a coherently received signal, systems, methods, and structures according to aspects of the present disclosure can identify the shaping factor along with transmission Q-factor through the effect of a cascaded convolutional neural network (CNN) in a first stage followed by multiple artificial neural network(s) (ANN) in a second stage.

Of further advantage, systems, methods, and structures according to aspects of the present disclosure permit the performance of optical networks either before turn-up live traffic, or during a retrofit of existing facilities. In this inventive manner, transponder data rates may be determined before the application of live customer traffic thereby maximizing optical network performance either before deployment or during retrofit.

As will be readily appreciated by those skilled in the art, given the capability of QoT estimation across different PS-QAM shaping factors—and in further contrast to the prior art—systems, methods, and structures according to aspects of the present disclosure may be employed to estimate G-OSNR for open line systems with wide operation ranges of spectral efficiency(ies—SE) while advantageously reducing estimation time(s) and computation complexity(ies) as only raw data from the received signal is required for training and prediction. Of further advantage and distinction, systems, methods, and structures according to the present disclosure may further reduce implementation cost over the prior art as only PS-QAM is required for G-OSNR analysis, instead of combining multiple analysis from different modulation formats.

BRIEF DESCRIPTION OF THE DRAWING

A more complete understanding of the present disclosure may be realized by reference to the accompanying drawing in which:

FIG. 3(A), FIG. 3(B), FIG. 3(C), FIG. 3(D), and FIG. 3(E) are plots illustrating results of two-stage hybrid neural network model in which: FIG. 3(A) is a plot of Count vs. Predicted Shaping Factor illustrating classification distribution of CNN for a is 0.39; FIG. 3(B) is plot of Count vs. Predicted Shaping Factor illustrating classification distribution of CNN for which a is 0.41; FIG. 3(C) is plot of G-OSNR RMSE (dB) vs Training Epoch illustrating ANN training curve for σ=0.39; FIG. 3(D) is plot of estimated G-OSNR (dB) vs True G-OSNR (dB) illustrating G-OSNR prediction results for σ=0.39; ANN model performance has σ=0.39; a saturation curve showing cleaner constellation according to aspects of the present disclosure; and FIG. 3(E) is plot of estimated G-OSNR (dB) vs True G-OSNR (dB) illustrating hybrid neural network performance for test data of 100 randomly selected channels—all according to aspects of the present disclosure;

Figure 1A:
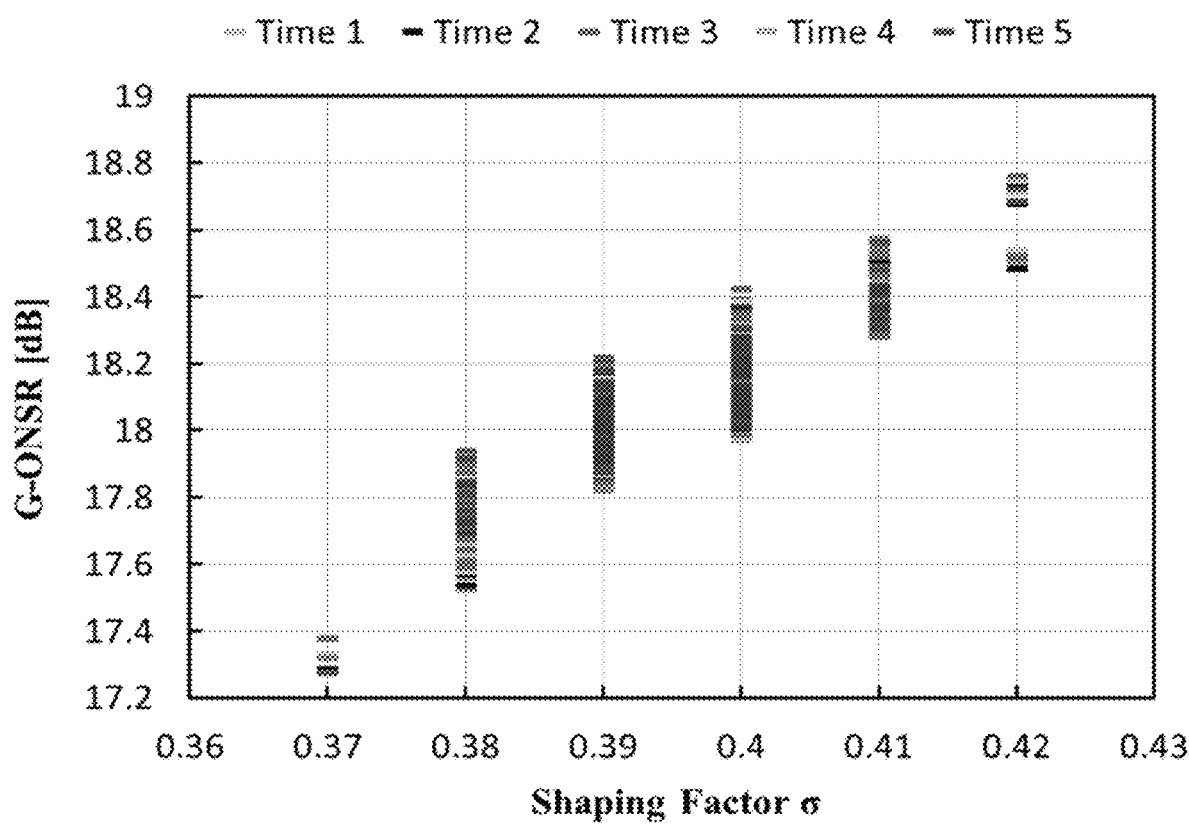
FIG. 1(A) is a plot of G-OSNR (db) vs. Shaping Factor illustrating the G-OSNR distribution for 138 channels of 6 shaping factors according to aspects of the present disclosure.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGS. comprising the drawing are not drawn to scale.

Introduction

By way of some additional background, we begin by noting that contemporary high bandwidth services and applications, such as cloud computing, fifth-generation (5G) wireless networks, and virtual reality, are precipitating an exponential growth of transmission capacity in optical transport networks. And while deployment of new transport infrastructures has immensely increased transmission capacity to over 10-Pb/s, usage optimization of existing optical fibers in a cost-efficient manner remains a goal of network venders.

In pursuit of such cost-efficient optimization, probabilistic-shaped 256 quadrature amplitude modulation (PS-256QAM) has been pursued as one method to improve transmission capacity in already deployed optical transport systems. However, while reducing spectral efficiency (SE) gap to the Shannon limit, it requires strict transmission quality in terms of bit error rate (BER) and Q factor.

For coherent open line systems, those skilled in the art will understand and readily appreciate that general optical signal-to-noise ratio (G-OSNR) deriving from back-to-back OSNR vs. Q or BER mapping is typically employed to evaluate transmission performance. G-OSNR considers both linear and nonlinear noises other than commonly used OSNR mainly presenting amplifier spontaneous emission (ASE) noise. Traditionally, a Q factor is manually measured with complicated and expensive digital signal processing (DSP) equipment. In such a scenario, the required processing is both time-consuming and expensive to achieve.

Recently, neural networks have been employed to facilitate quality of transmission (QoT) evaluation in optical transport networks. In this disclosure, we describe a two-stage hybrid neural network model that estimates G-OSNR for deployed standard single-mode fiber (SSMF) metro networks with optimized PS-256QAM modulation format.

According to aspects of the present disclosure, raw data from 138 channels in C-band are fed into the model. A convolutional neural network (CNN)—comprising the first stage of our systems, methods, structures, and models—classifies a shaping factor of the modulation format with 80.96% accuracy. The second stage—comprising several artificial neural network (ANN) models according to each shaping factor—estimates the G-OSNR within 0.2 dB root mean square error (RMSE). Advantageously—and surprisingly—a total RMSE of estimated G-OSNR can be obtained as 0.27 dB with test data.

PS-256QAM Raw Datasets and Two-Stage Hybrid Neural Network Model

As will be readily appreciated by those skilled in the art, PS-256QAM raw datasets employed in this disclosure comprise two-direction IQ complex signals from 138×32-Gbaud channels of a deployed metro network with 33.3-GHz spacing in C-band. By splitting symbol data into real and imaginary parts, the data format obtained is 4×5,216,000 along a single channel.

Probabilistic constellation shaping follows Gaussian-distributed amplitude levels as:

$$p(x_i) = \frac{1}{\sqrt{2\pi\sigma^2 P}} \exp\left(-\frac{|x_i|^2}{2\sigma^2 P}\right)$$

where $$P = \frac{1}{N} \sum_{x_i \in C} |x_i|^2$$

is the mean square of allowable amplitude levels. A shaping factor 6 and launch power for each channel are already optimized to guarantee maxmized throughoutput with zero BER after low-density parity check (LDPC) decoding and minimal nonlinear penalty, respectively.

Effective OSNR are calibrated at a receiver side for all 138 channels at different instants of time. Instead of using channel frequency as a feature of datasets, shaping factor 6 has more direct relation to channel G-OSNR distribution as shown illustratively in FIG. 1(A). As may be observed from that plot, G-OSNR values of all 138 channels at five different time instants are categorized into 6 groups according to different shaping factors from 0.37 to 0.42 at a granularity of 0.01. As may be further observed, the G-OSNR increases as the channel assigned shaping factor increases. And for each shaping factor, channel G-OSNR values are assembled in a band around 0.4 dB.

Figure 1B:
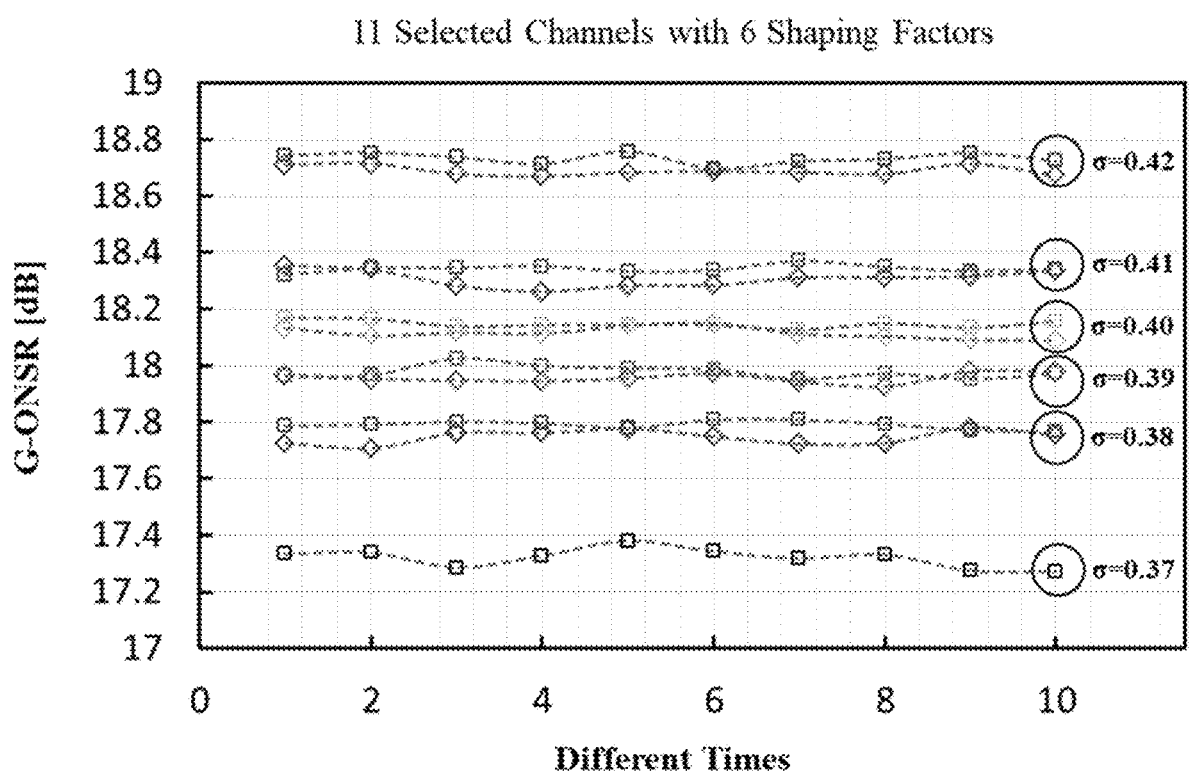
FIG. 1(B) is a plot of G-OSNR (db) vs. Different Times illustrating the G-OSNR distribution with various times for 11 selected channels according to aspects of the present disclosure.

FIG. 1(B) is a plot illustrating how the G-OSNR oscillates at various time instants of 11 selected channels from 6 shaping factors. Each channel G-ONSR value fluctuates in a 0.2 dB band.

Figure 2:
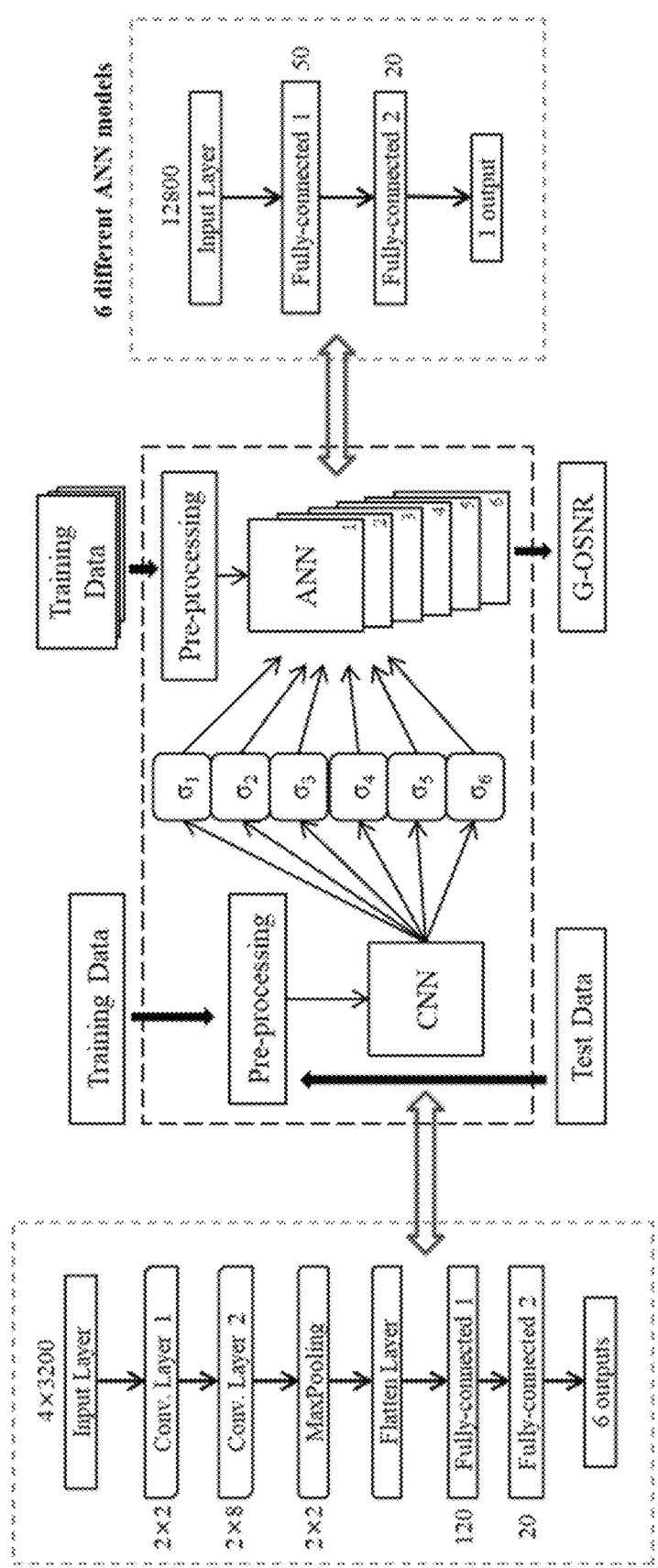
FIG. 2 is a schematic diagram illustrating a two-stage hybrid neural network model wherein a structure of a Convolutional Neural Network (CNN) classifier is on the left, Artificial Neural Network (ANN) models are shown on the right, and model workflow is in the middle, according to aspects of the present disclosure.

FIG. 2 is a schematic diagram illustrating a two-stage hybrid neural network model wherein a structure of a CNN classifier is on the left, ANN models are shown on the right, and model workflow is in the middle, according to aspects of the present disclosure.

Based on the features of PS-256QAM datasets—our designed two-stage hybrid neural network model as illustrated—both CNN classifier and ANN regression use Adam optimization algorithm(s) and Standard Scaler pre-processing. Additionally, all convolutional and fully-connected layers work with rectified linear unit (ReLU) activation function.

As will be appreciated by those skilled in the art—since we have huge and complicated datasets—before the raw data are fed into the model, they are chopped or otherwise segmented into 163 segments as 4×3200×163 per channel. This advantageously simplifies the problem as local feature abstraction as image recognition. We mainly consider patch signal transmission patterns other than close relation between every signal symbol. This further decreases the complexity of the model and advantageously accelerates training time.

As may be observed from FIG. 2, the first stage of the model is a CNN classifier with 2 convolutional, 1 pooling. 1 flatten, 2 fully-connected layers, and 6 outputs for different shaping factor categorizations. Loss function is categorical cross entropy and dropout is set as 0.3. The input layer receives a segment of 4×3200 IQ data as a single sample.

After the CNN classifier, the G-OSNR values are closed within each group of same probabilistic-shaped channels. Then ANNs are used to consider all possible relations for all data symbols to dig out dataset information. Thus, the second stage of the model comprises several fully-connected ANN regressions to estimate G-OSNR for various probabilistic-shaped channels. The input data is flattened as 12800 before being fed to ANN. Each ANN has two hidden layers with 50 and 20 neurons, respectively. Root mean square error is chosen as loss function and dropout is 0.5. Used learning rates are less than 0.001 to ensure fine-grained granularity regression.

Illustrative Results

During the model training and test, 138-channel symbol data in 53 segments out of 163 were used to accelerate modeling time. For the CNN classifier, the total number of training samples was 53×138×4=29,256 from four different time instants. Additionally, 53×138=7,314 samples from another time instant are used for test. After 150 epochs training, the classifier obtains 94.73% accuracy with training data, and 80.96% accuracy with test data.

Figure 3A:
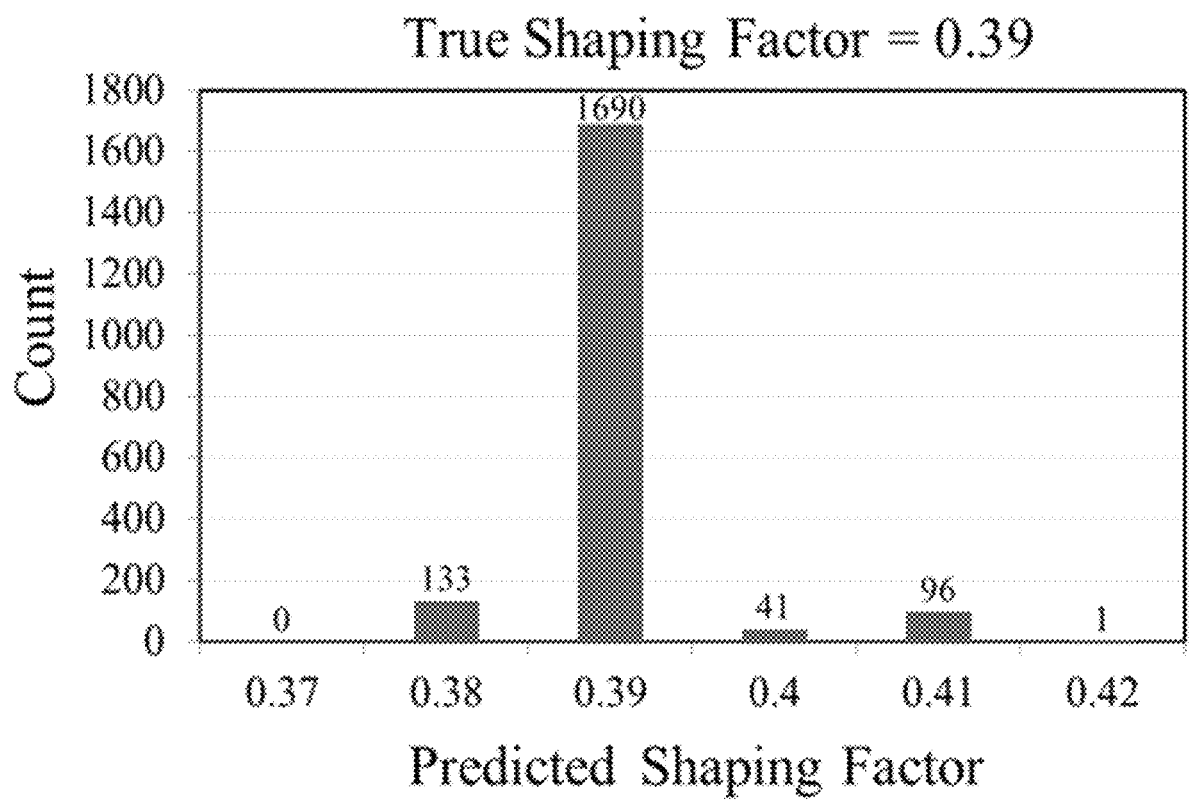
Figure 3B:
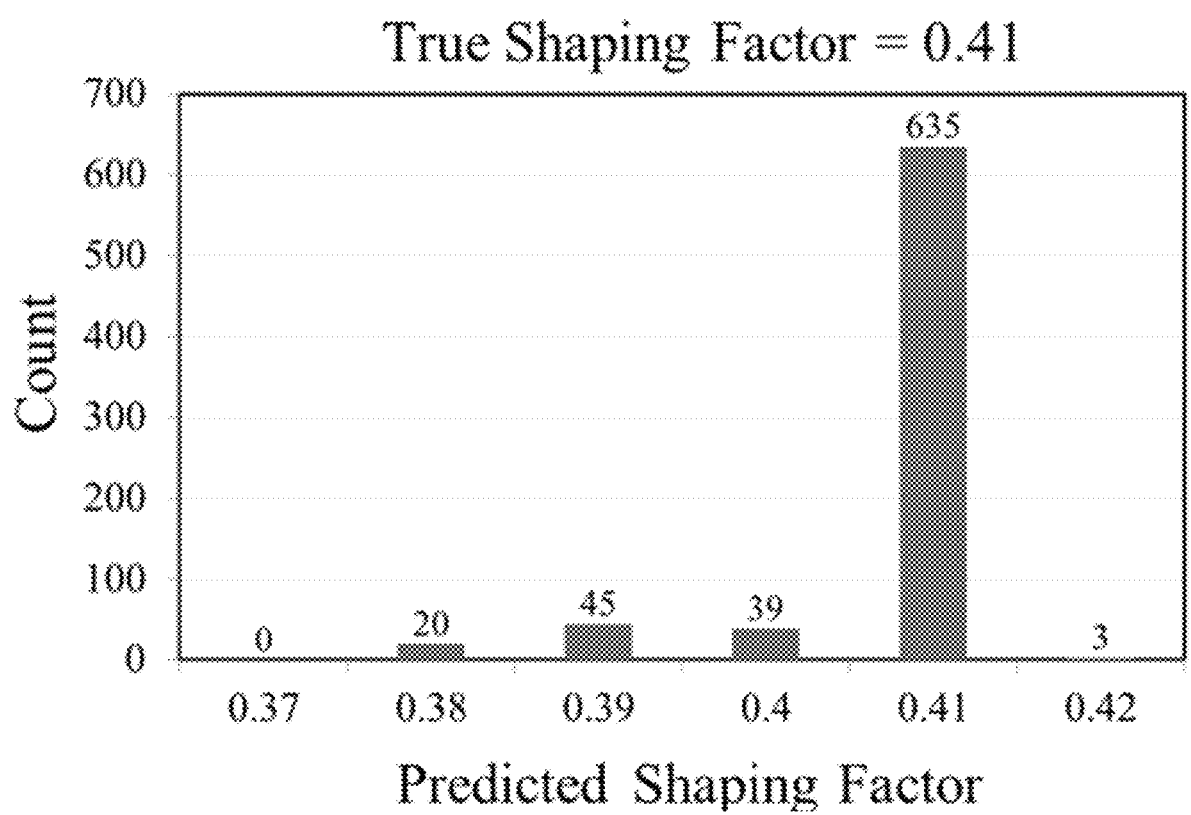
Figure 3C:
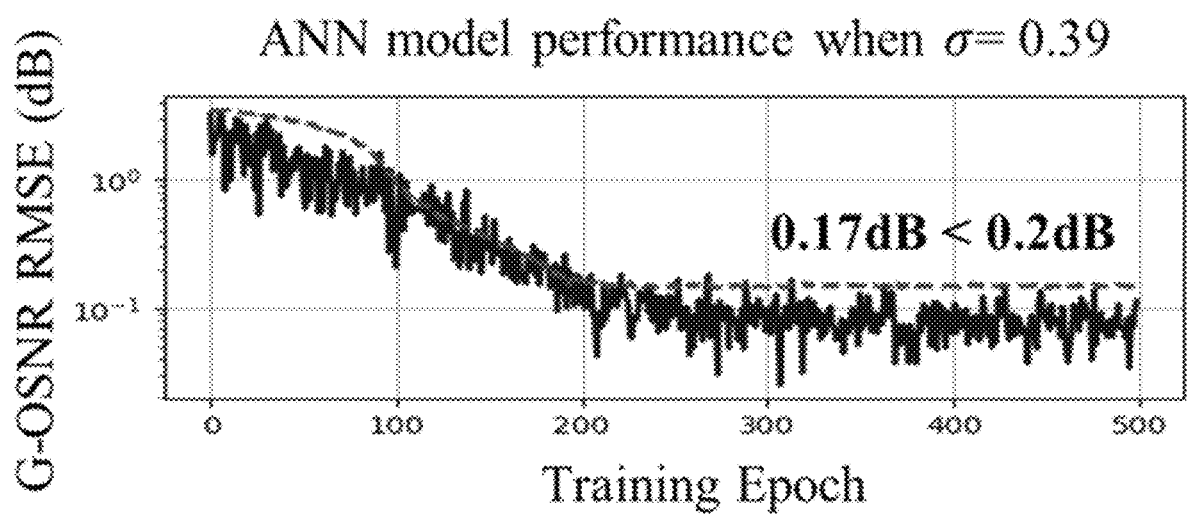
Figure 3D:
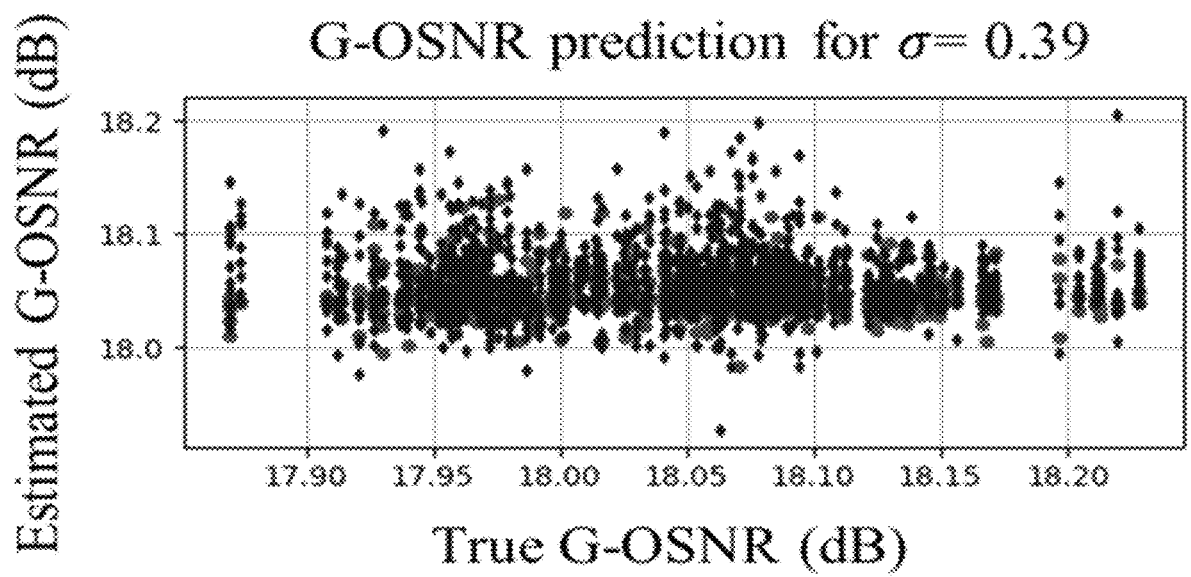
Figure 3E:
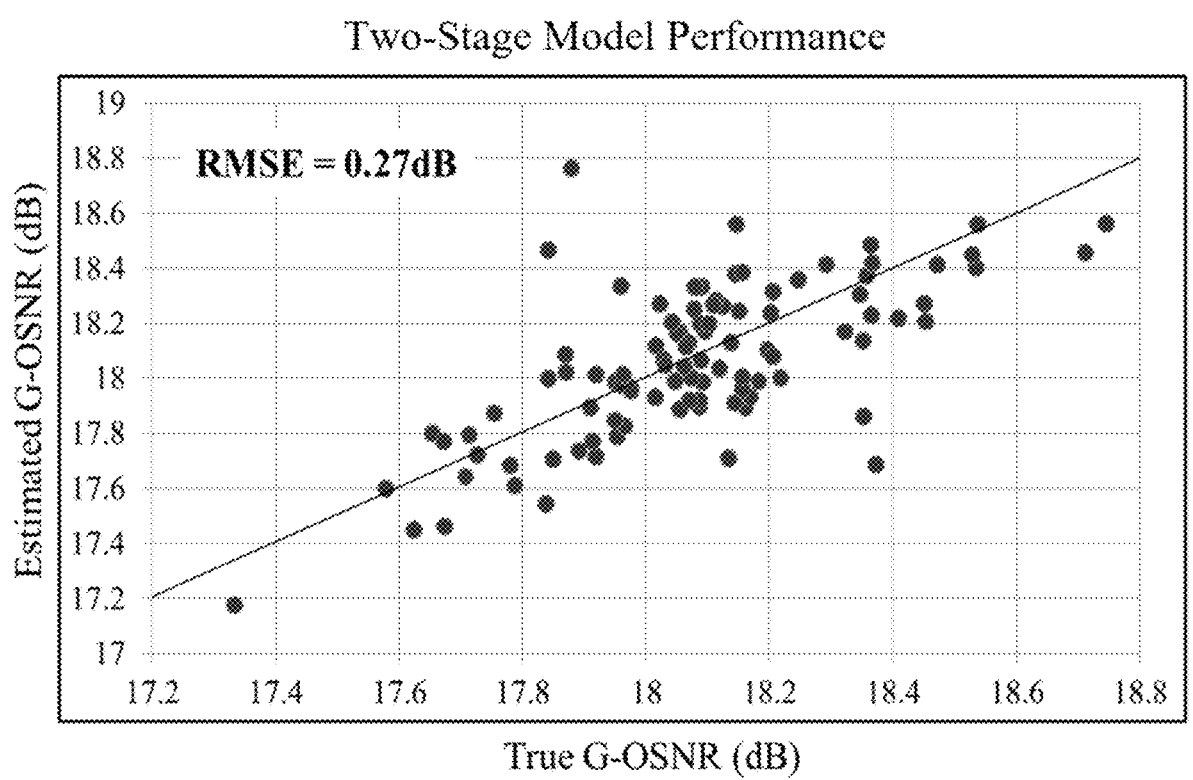

FIG. 3(A), FIG. 3(B), FIG. 3(C), FIG. 3(D), and FIG. 3(E) are plots illustrating results of two-stage hybrid neural network model in which: FIG. 3(A) is a plot of Count vs. Predicted Shaping Factor illustrating classification distribution of CNN for σ is 0.39; FIG. 3(B) is plot of Count vs. Predicted Shaping Factor illustrating classification distribution of CNN for which a is 0.41; FIG. 3(C) is plot of G-OSNR RMSE (dB) vs Training Epoch illustrating ANN training curve for σ=0.39; FIG. 3(D) is plot of estimated G-OSNR (dB) vs True G-OSNR (dB) illustrating G-OSNR prediction results for σ=0.39; ANN model performance has σ=0.39; a saturation curve showing cleaner constellation according to aspects of the present disclosure; and FIG. 3(E) is plot of estimated G-OSNR (dB) vs True G-OSNR (dB) illustrating hybrid neural network performance for test data of 100 randomly selected channels—all according to aspects of the present disclosure.

The performance of the CNN is shown in FIG. 3(A) and FIG. 3(B). Most predicted shaping factors are accurate as the channel originally assigned ones. Interestingly, some inaccurate predictions are located in neighbor shaping factors ranging from 0.38 to 0.41, while only few predicted results are located in 0.37 and 0.42. As shown in FIG. 1(A), the shaping factor based G-OSNR band is within 0.4 dB. Note that there are some overlaps between groups from 0.38 to 0.41, and the groups of 0.37 or 0.42 have certain guard gap for G-OSNR band—indicating more distinct group distribution. Accordingly, our CNN classifier reflects the distribution features of the datasets.

For ANN regression training, less than 10 channels in each shaping factor based channel group are selected. More particularly, 53 segments from 4 different time instants for a channel are used as the CNN while data from other time(s) are chosen for testing. During the ANN model training—and as will be appreciated by those skilled in the art—different groups require different number of training epoch ranging from 150 to 500 when using same learning rate.

FIG. 3(C) presents that the model achieves 0.17 dB G-OSNR RMSE for channel group of shaping factor σ=0.39 after 250 training epochs. FIG. 3(D) shows the prediction results for this group. The other five ANN models also guarantee estimated G-OSNR RMSE less than 0.2 dB.

After CNN classifier and six ANN regressions are trained, 100 randomly selected channels are fed into our two-stage hybrid neural network model. The model performance is presented in FIG. 3(E). As may be observed, a total RMSE of predicted G-OSNR is obtained as 0.27 dB for the deployed SSMF metro network with high throughput PS-256QAM transmission format.

We note that as we have shown and discussed our hybrid neural network model according to aspects of the present disclosure comprising CNN and ANN will predict G-OSNR with 0.27 dB RMSE for optimized PS-256QAM raw data from deployed optical transport systems. Advantageously, systems, methods, and structures employing a model according to the present disclosure provides a cost-efficient way to modelling neural networks for optical transmission quality evaluation.

With these teachings in place with regards to the use of our inventive neural network based G-OSNR in optical networks, we now show how our inventive teachings may be applied to the design/deployment/tuning/optimization of an optical fiber network employing wavelength-division-multiplexing technologies as well as the retrofit/upgrade of an existing network.

Figure 4:
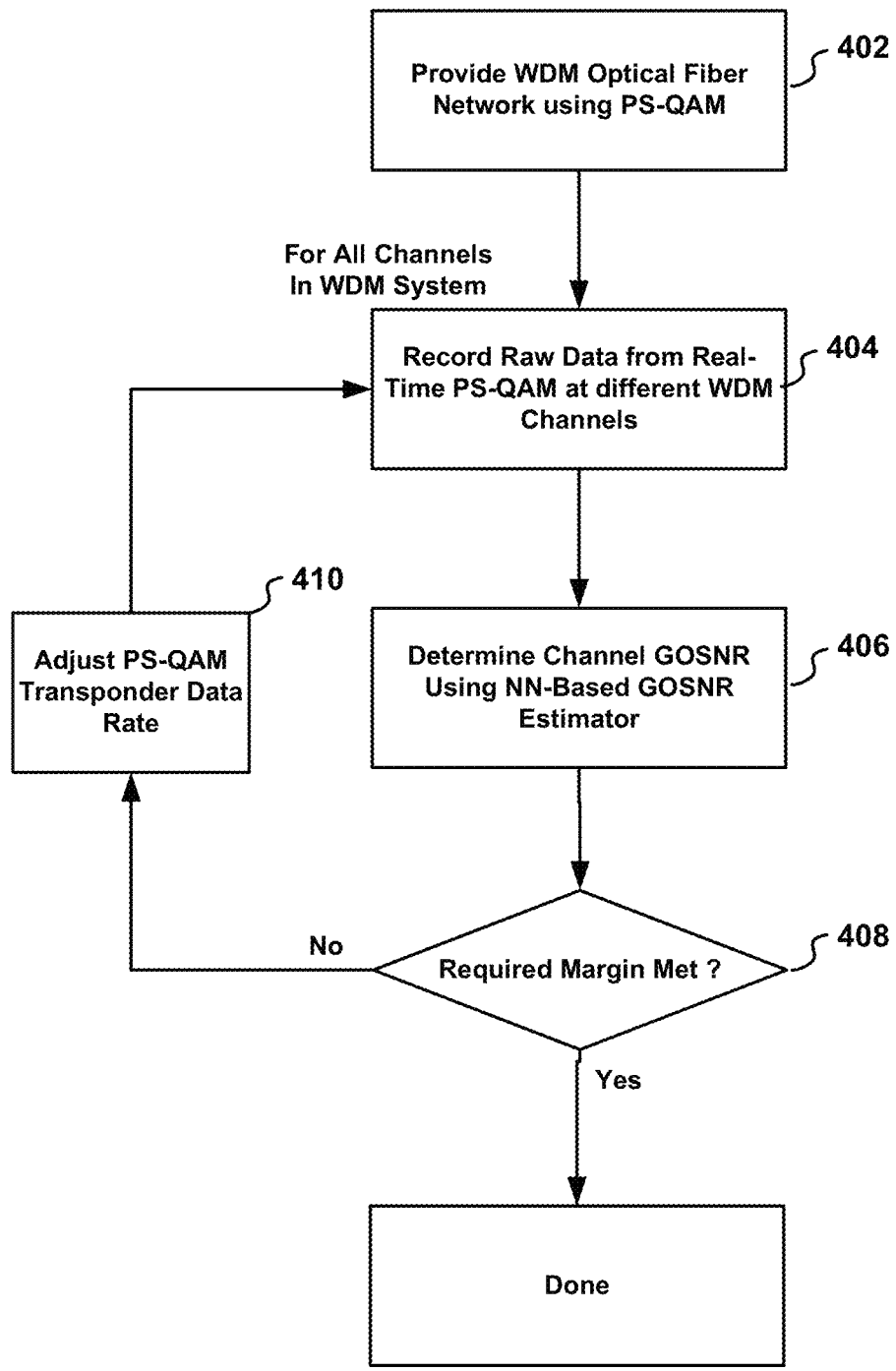
FIG. 4 is a flow diagram describing an illustrative method according to aspects of the present disclosure.

FIG. 4 is a flow diagram of an illustrative method for tuning/optimizing the performance of a WDM optical fiber network according to aspects of the present disclosure. As illustrated in that figure, a WDM optical fiber network having one or more individual channels (wavelengths) is provided at Block 402. At Block 404, PS-QAM transponders are provided/employed on selected ones of the channels and for all selected channels, a record of raw data obtained from real-time PS-QAM on the selected channel(s) at Block 406.

At Block 408, channel GOSNR for the selected channel is determined through the effect of a neural network based GOSNR estimator. If any predetermined threshold/margins are not met (Block 410) then PS-QAM transponder data rate is adjusted at Block 412 and steps indicated at Blocks 406-408 are repeated until any predetermined threshold/margins are met. When this procedure is performed for all channels in the WDM system, each of the individual transponders will have been adjusted to provide a desired and/or optimal performance for the given WDM optical network.

The network capacity may then be estimated using the recorded data rates for the selected channels for any upgrade/installation.

Figure 5:
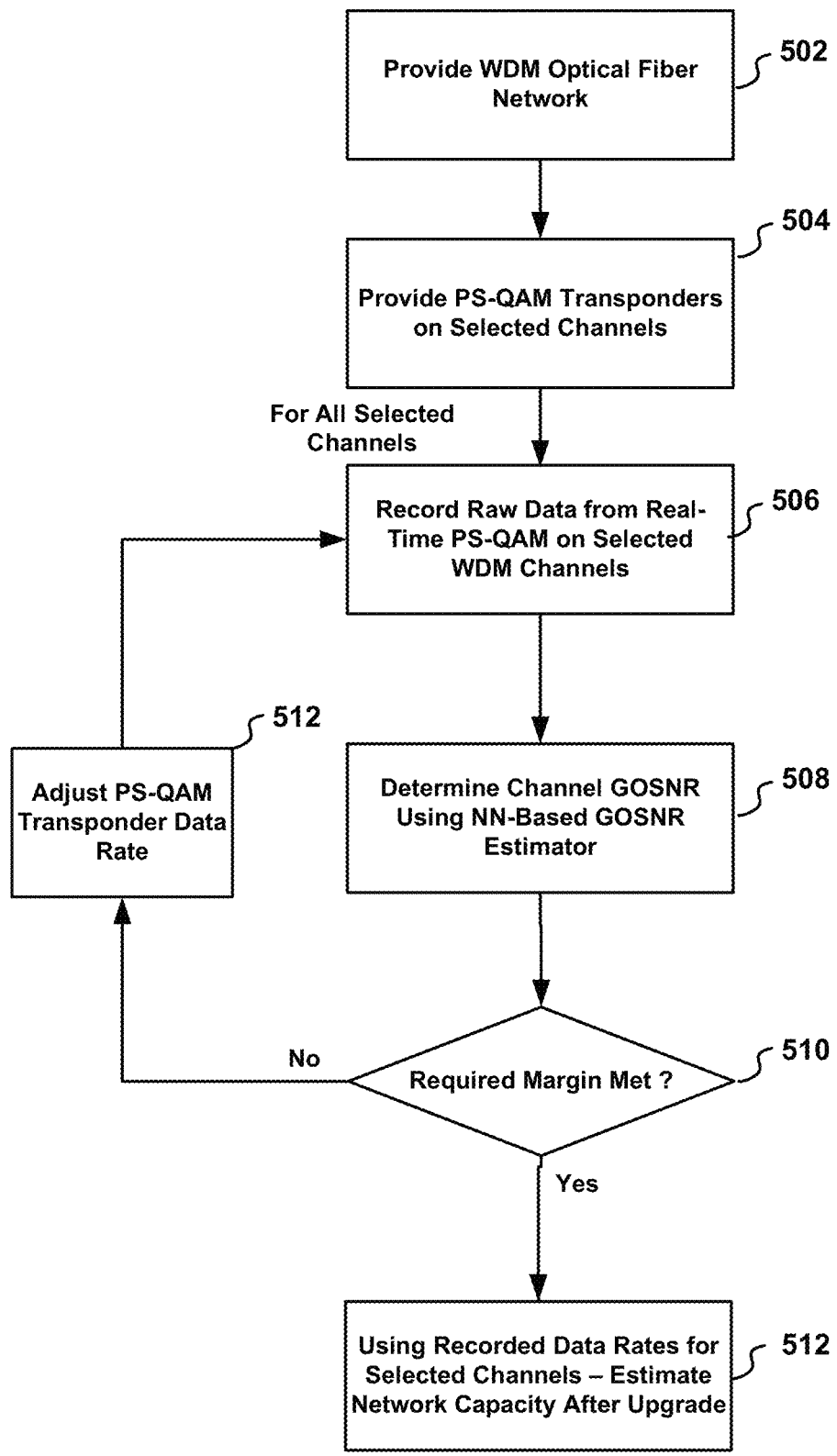
FIG. 5 is a flow diagram describing an illustrative method according to aspects of the present disclosure.

FIG. 5 is a flow diagram of an illustrative method for estimating the performance a WDM optical fiber network according to aspects of the present disclosure. As illustrated in that figure, a WDM optical fiber network having one or more individual channels (wavelengths) is provided at Block 502. At Block 504, PS-QAM transponders are provided/employed on selected ones of the channels and for all selected channels, a record of raw data obtained from real-time PS-QAM on the selected channel(s) at Block 506.

At Block 508, channel GOSNR for the selected channel is determined through the effect of a neural network based GOSNR estimator. If any predetermined threshold/margins are not met (Block 510) then PS-QAM transponder data rate is adjusted at Block 512 and steps indicated at Blocks 506-510 are repeated until any predetermined threshold/margins are met. The network capacity may then be estimated using the recorded data rates for the selected channels for any upgrade/installation.

Figure 6:
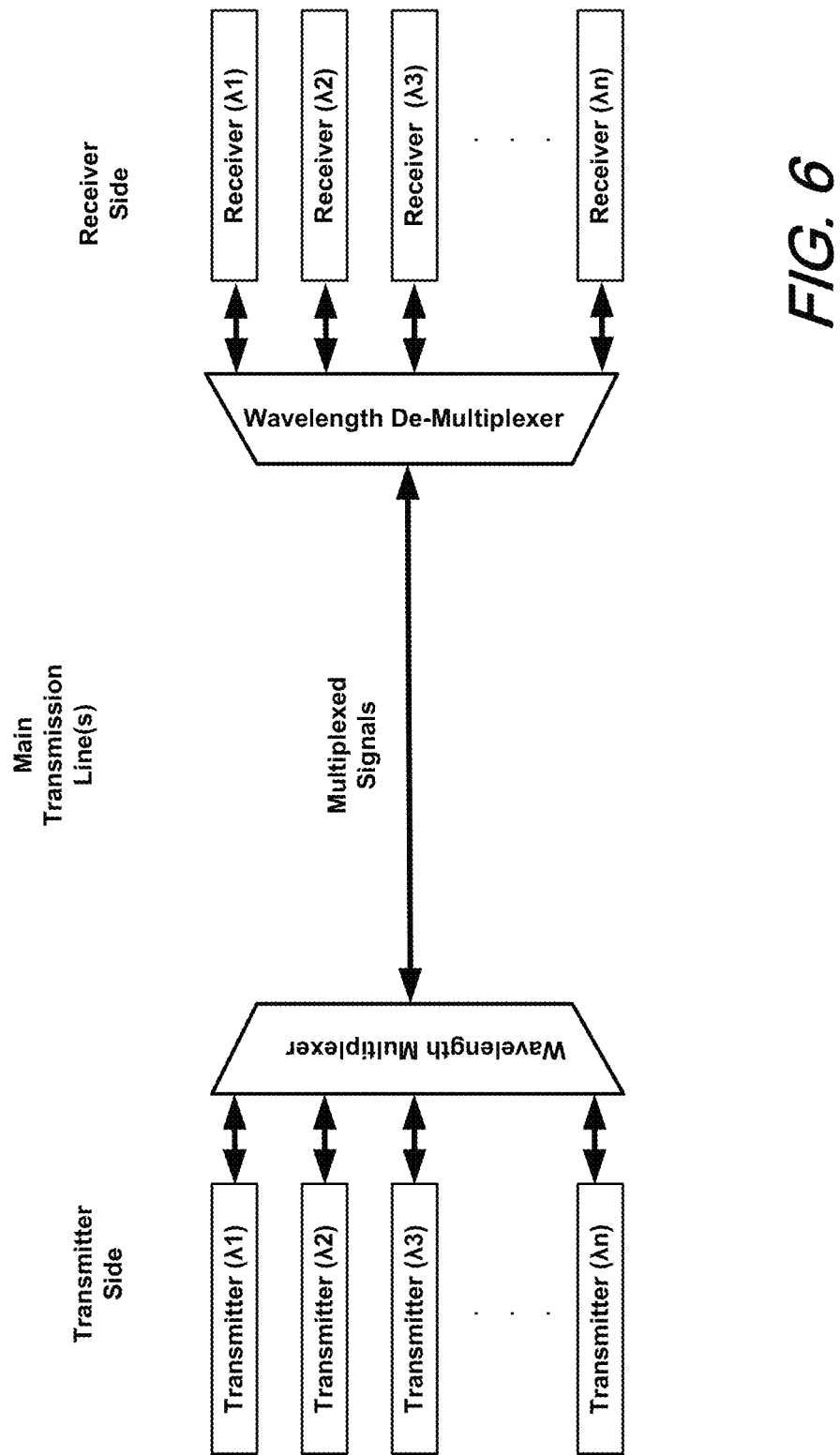
FIG. 6 is a schematic diagram of an illustrative dwdm optical network according to aspects of the present disclosure.

FIG. 6 is a schematic diagram of an illustrative WDM optical network that may be employed according to aspects of the present disclosure. We note that while we have shown the transmit and receive sides of the network employing transmitters and receivers respectively, such a network may include combined structures, i.e., transceiver(s).

At this point, while we have presented this disclosure using some specific examples, those skilled in the art will recognize that our teachings are not so limited. In particular, a CNN classifier with 80.96% classification accuracy might be improved with more reasonable data pre-processing based constellation shaping technology. Datasets with various pre-emphasized channel power or under-optimized constellation shaping could be used to train and modify the model for more general and dynamic optical transport networks. Accordingly, this disclosure should be only limited by the scope of the claims attached hereto.

The invention claimed is:

1. A method for tuning a wavelength division multiplexed (WDM) optical fiber network comprising:
    recording raw data from real-time probabilistic-shaped quadrature amplitude modulation (PS-QAM) on selected WDM channels;
    determine, for each of the selected channels, a general optical signal to noise ratio (G-OSNR) of optical signals exhibiting the PS-QAM, through the effect of a two-stage, hybrid neural network including a convolutional neural network (CNN) classifier in a first stage, followed by a second stage including a plurality of artificial neural networks (ANN) that estimates the G-OSNR after the CNN Classification;
    determining, for each of the selected channels, if the estimated G-OSNR meets or exceeds a predetermined threshold/margin.

2. The method of claim 1 further comprising:
    adjusting a PS-QAM transponder data rate for each of the selected channels when the G-OSNR for the transponder does not meet or exceed the predetermined margin.

3. The method of claim 2 further comprising:
    repeating the recording, determining, determining, and adjusting steps until the estimated G-OSNR for all of the selected channels meet or exceed the predetermined margin.

4. The method of claim 3 further comprising:
    determining a capacity estimate of the WDM optical network from the adjusted data rate(s); and
    outputting an indicia of the network capacity.

5. The method of claim 3 wherein the two-stage, hybrid neural network uses only the raw data as input for the estimation.

6. The method of claim 5 the PS-QAM raw data is associated with a shaping factor that is used to generate different format spectral efficiency.

7. The method of claim 1 wherein the CNN comprises several layers including 2 convolutional, 1 pooling, 1 flatten, and 2 fully-connected layers and 6 outputs for different shaping factor categorizations.

8. The method of claim 7 wherein the ANN includes a plurality of ANN regressions to estimate the G-OSNR for various probabilistic-shaped channels.

9. The method of claim 8 wherein the ANN includes two hidden layers each having 50 and 20 neurons, respectively.

10. The method of claim 9 wherein a plurality of ANN training models, at least one for each differently classified group is employed for training.

* * * * *